June 22, 1926. 1,589,370
A. V. CONOVER
LENS
Filed June 10, 1924 3 Sheets-Sheet 1

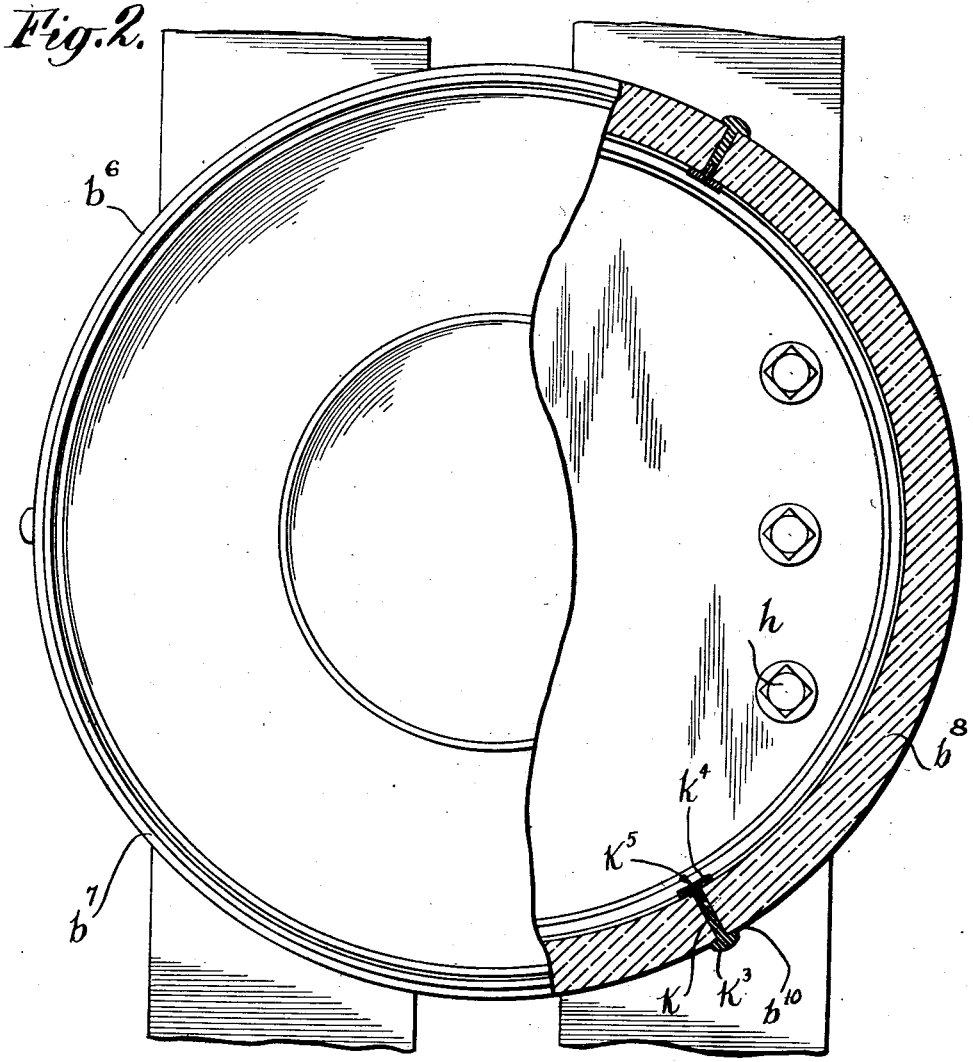

June 22, 1926.  
A. V. CONOVER  
1,589,370  
LENS  
Filed June 10, 1924  3 Sheets-Sheet 3
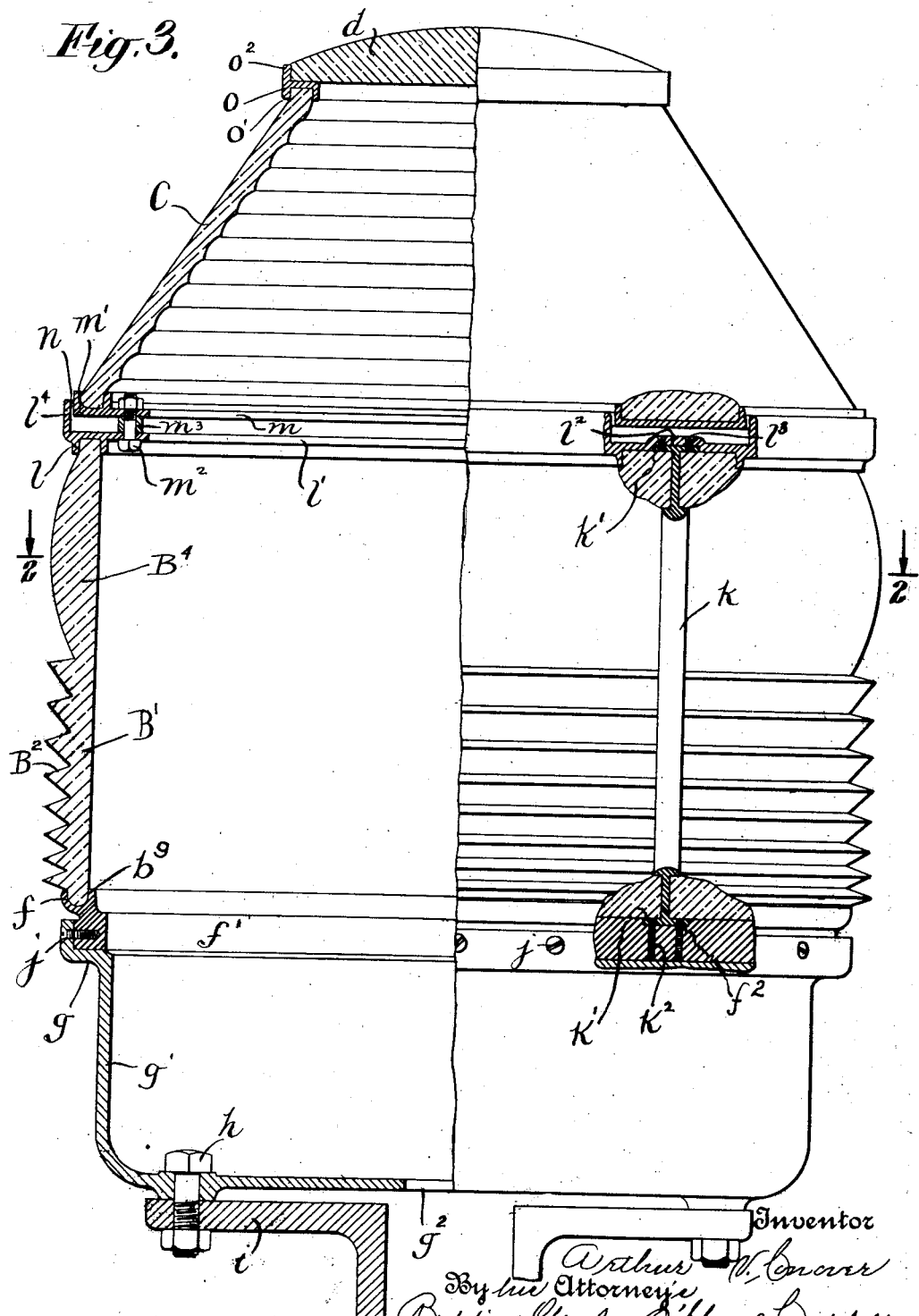

Patented June 22, 1926.

1,589,370

UNITED STATES PATENT OFFICE.

ARTHUR V. CONOVER, OF PHILADELPHIA, PENNSYLVANIA, ASSIGNOR TO INTERFLASH SIGNAL CORPORATION, OF NEW YORK, N. Y., A CORPORATION OF NEW YORK.

LENS.

Application filed June 10, 1924. Serial No. 719,061.

This invention relates to lenses and has for its object to provide a lens which shall project a hemispherical light or beam or beams of light in all directions above the horizontal to serve as a beacon or the like. In accordance with the invention the lens comprises a plurality of sections secured together in any convenient manner and adapted to enclose a source of light. More specifically the lens comprises a cylindrical portion formed with a plurality of prisms disposed below the plane of the light source and a portion of plano-convex cross section disposed in the plane of the light source and a dome having a lenticular surface superimposed upon the cylindrical portion. In order that all of the rays emanating from the light source may be availed of, a reflector may be disposed in the lower end of the cylindrical portion.

The lens according to the present invention will probably have its greatest application as a beacon light to indicate a route for aeroplane or airship travel and in such capacity may be mounted upon a standard or other elevation in a manner to project a hemisphere of light outwardly and upwardly to be visible in all directions. In order that various routes across country may be easily distinguished one from another, it is proposed to color a portion of the light emanating from a lens of this character and to this end a portion of the lens is colored whereby a ray of colored light may form a part of the complete hemispherical ray.

In order that the invention may be clearly understood and readily carried into effect the same will now be described more fully with reference ot the accompanying drawings which illustrate an ideal conception of the invention and a practical application thereof. In the drawings—

Figure 2 is a view looking from above in Figure 3 at about the plane of the line 2—2 therein and showing a method of connecting the various lens portions.

Figure 3 is a view similar to Figure 1 showing a modification of the invention and the supporting and connecting frame work for the various portions of the lens necessary in the practical application of the invention.

Figure 1:
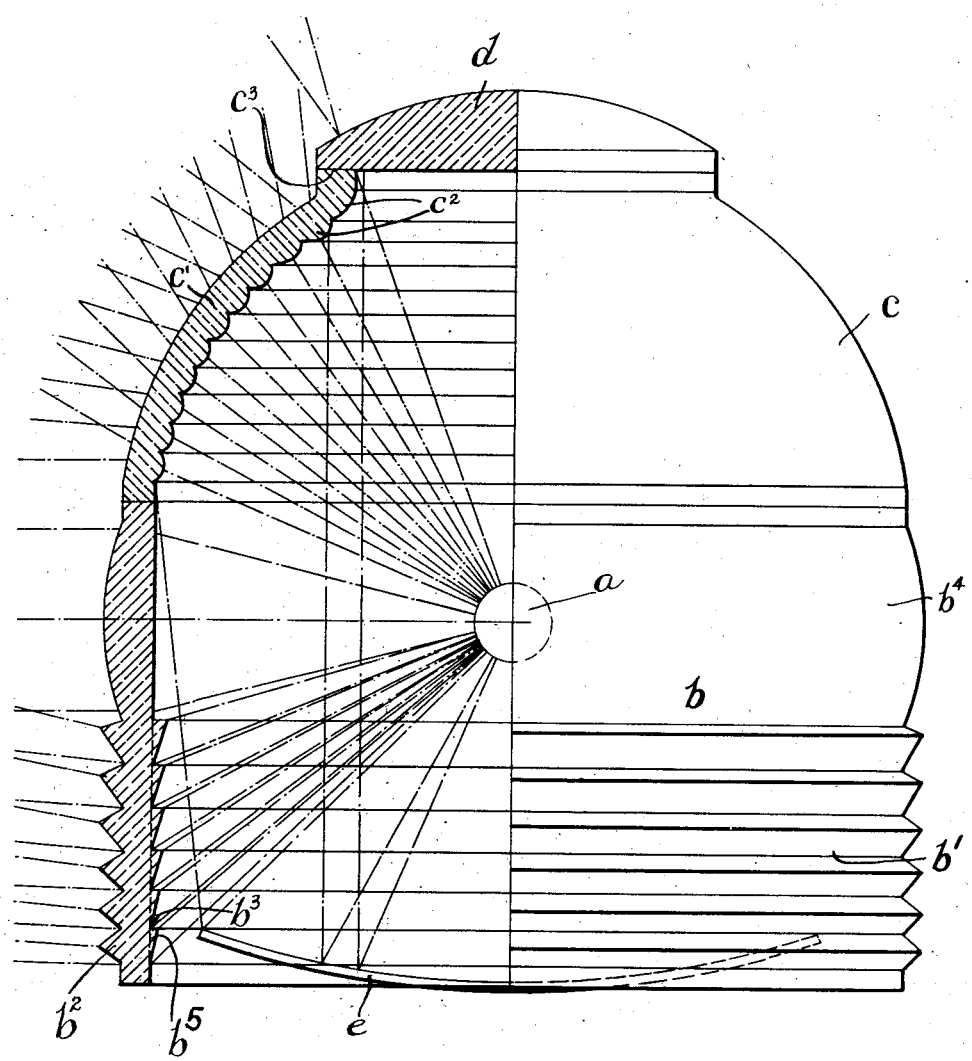
Figure 1 is a view partly in elevation and partly in section of a lens according to the invention.

While the lens according to the present invention may be applicable in many different situations it will be described in the present instance as applied to beacons or route markers for air travel. Such a beacon and a lens of this general type is disclosed in the co-pending application of the present applicant filed June 13, 1924, Serial No. 719,753. The lens, as shown in Figure 1, is adapted to surround a light source $a$ upon all but one side and comprises a plurality of sections formed of different cross sectional configuration whereby a beam of the desired kind may be projected. The lowermost portion of the lens $b'$ which is disposed entirely below the light source is a cylinder which in the practical embodiment of the invention will very probably be formed with a diameter of 200 m. m. which with a theoretical point source of light will give the proportions enumerated throughout the following specification. In actual practice, of course, the light source will not be a point source and consequently the actual spread of the rays in use will be slightly larger than that hereinafter described. As shown in the drawings the cylindrical portion of the lens has a plurality of prisms formed upon its inner and outer surfaces. It will be observed that the prismatic portions of the cylindrical portion $b$ are disposed in substantially the same horizontal planes so that an inner portion $b^5$ and an outer prismatic portion $b^2$ together form an individual prism designed to direct all light from the light source falling thereupon in a narrow circular wedge above the horizontal, say from 1° to 10° thereabove. The rays directed by the prisms will overlap considerably thus giving a uniform beam without streaks. Preferably the prisms will be adjusted for minimum deviation of the ray striking the middle portion of each prism. This arrangement will permit the shortest path to be taken by all the rays through the prisms and will consequently minimize the proportion of light lost by absorption. Furthermore there will be no internal reflection in the prism proper by this construction except possibly a small portion of the light which strikes the horizontal top $b^3$ of the inside portion of each prism. In the practical application of the invention the following table will be found useful in giving the data necessary to carry out the same. It will be observed that the cylindrical portion $b$ is shown as formed with six prisms although any number may be used as desired.

| Prism number top down. | Vertical height m. m. | Angle of faces with vertical. | | Total angles of prisms. | Angles of rays emitted with horizontal. | | Per cent of total light used by each prism. |
|---|---|---|---|---|---|---|---|
| | | Inside. | Outside. | | Lowest. | Highest. | |
| | | Degrees. | Degrees. | Degrees. | Degrees. | Degrees. | |
| 1 | 12 | 17 | 27 | 44 | 4.6 | 10.4 | 3.1 |
| 2 | 10.5 | 16 | 34 | 50 | 5.2 | 9.6 | 2.5 |
| 3 | 10 | 14 | 41 | 55 | 3.4 | 7.5 | 2.2 |
| 4 | 10 | 12 | 44 | 57 | 2.7 | 4.9 | 2.0 |
| 5 | 9.5 | 10 | 51 | 61 | 2.4 | 3.0 | 1.7 |
| 6 | 9 | 10 | 53 | 63 | 1.2 | 3.9 | 1.4 |

In the illustrated embodiment the cylindrical portion $b'$ is disposed entirely below the light source. Immediately above the cylindrical portion $b'$ is a cylindrical portion $b^4$ which is formed as a plano-convex lens in vertical cross section. This portion $b^4$ may be integral with the portion $b$ or may be secured thereto in any convenient or appropriate manner. The cylindrical portion $b^4$ is disposed with its median plane in substantially the horizontal axis of the light source and the radius of curvature of the lens is such that its center of curvature is the light source. In practice a lens of the curvature of 50 m. m. will be used in conjunction with a lens of the dimensions hereinbefore recited. With this construction therefore the light source is at the focus of lens $b^4$ and all light reaching this portion is emitted in practically horizontal parallel rays. Of course, since the light source is not a point in the practical application of the invention, there will be a slight spread of the rays emanating from this portion of the lens due to the size of the source. Immediately above the cylindrical portion $b^4$ is shown a hemispherical dome $c$, the outer surface $c'$ of which is spherical while the inner surface is formed of a series of annular flutes or lenses $c^2$ disposed in horizontal planes and of such radius of curvature and diameter that the rays emanating from the light source will be caused to have an angular spread which will have the effect of crossing and so interlock as to give an even distribution of light in this region. In practice with a lens of the dimensions hereinbefore recited the dome will be formed with a radius of 100 m. m. while the most satisfactory results will be obtained if the annular flutes on the interior are formed with a 5 m. m. radius of curvature and 8 m. m. in diameter. The lower rays emanating from dome $c$ will be found to augment the light rays traveling in substantially horizontal directions while the upper rays will be caused to project in substantially vertical directions. The extreme upper portion of dome $c$ is cut off and formed with a seat $c^3$ to receive a bull's eye lens $d$. This lens is preferably colored whereby a ray of distinct and different color may be formed in the hemisphere of light emanating from the lens as a distinguishing feature. Of course when used as a beacon and not intended to distinguish one route from another the bull's eye lens will not necessarily be colored. In practice it is preferred to use a standard signal lens of proper focal length and it will be obvious that one lens may be substituted for another and the spread of light therefrom thereby increased or decreased by decreasing or increasing the focal length of lens used. Disposed in the lowermost portion of the lens is a reflector $e$ which is preferably a polished manganin or silvered glass spherical mirror of such radius of curvature that the light emanating from the source in a downward direction is thrown back into the light source and serves to increase the intensity of the rays. The lens is formed of such curvature and diameter that the outside rays will have just sufficient spread to include the dome and colored lens region. With this construction very little of the light striking the lower part of the dome will be lost by internal reflection, but the greater portion thereof will be emitted at angles from 60° to 90° with the horizontal.

The light distribution in the interior and on the exterior of the lens will be as follows:

| Part of lens | Solid angles subtended | Per cent of total light | Range of distribution degrees with horizontal | |
|---|---|---|---|---|
| | | | Minimum | Maximum |
| | Degrees | | Degrees | Degrees |
| Prisms | 27 | 15 | 1.2 | 10.4 |
| Plano-convex lens | 32 | 17.8 | 0 | 0 |
| Annular fluted dome direct | 40 | 22.2 | 0 | 85 |
| Annular fluted dome reflected | 13 | 7.2 | 60 | 90 |
| Bull's-eye lens, direct rays | 21 | 11.7 | 74.1 | 90 |
| Bull's-eye lens, reflected rays | 32 | 17.7 | 54.2 | 90 |
| Loss due to frame, etc | 15 | 8.4 | | |
| Total | 180 | 100 | 0 | 90 |

The approximate percentage distribution of the light rays after leaving the lens is as follows:

| Angle with horizon | Per cent of total light | Per cent per degree | Parts of lens emanating from— |
|---|---|---|---|
| 0°–10° | 35.0 | 3.5 | Prisms 16% lens 17.8% dome 2.2% dome direct 20%. |
| 10°–90° | 27.0 | .3 | Reflected 7% reflected. |
| 54°–74° colored | 10.0 | .5 | Reflected and direct. |
| 74°–90° colored | 20.0 | .8 | |

The foregoing table does not take into account the reflection factor of the mirror.

For greater accuracy the reflected ray should be multiplied by the reflection factor of the mirror, not greater than 0.85 and the colored rays by the transmission of the glass, not greater than .4 or .5.

The rays as illustrated in Figure 1 are not the true paths taken thereby but are merely indicative of the direction the rays take after leaving the lens. In the case of the lens at the top of the dome the rays all cross fairly close to the lens. It may be found advantageous to use as a reflector one of such curvature as to form an image of the light source at the source itself. This will increase the intensity of the upper hemisphere.

The foregoing calculations have been based upon the assumption that the glass used in the lens will have a refractive index of 1.53. The use of different glass will of course vary slightly the foregoing data.

In Figure 1 the lens is shown as formed of three general sections whereof the abutting surfaces are shown as joined by cement, litharge, plaster of Paris or the like. Practically such a method of connecting the various portions is not practical. Reference will now be had to Figures 2 and 3 which disclose a frame work for the lens and a practical embodiment thereof which will give the results hereinbefore described and which will be found from manufacturing considerations to be more advantageous. Referring to Figure 3 the cylindrical portions $B'$, and $B^4$ of the lens will be formed in one piece. However, to facilitate manufacturing and assembling the cylinder may be subdivided into three arcuate lenses as shown clearly in Figure 2 and marked $b^6$, $b^7$ and $b^8$, respectively of 120° each. It will be observed that the lens portions $B'$ is formed at its outer surface with eight prisms $B^2$ and that its upper portion is formed with the plano-convex lens $B^4$. The lower portion of this cylindrical lens is rounded as at $b^9$ and is adapted to be retained by cement, litharge, plaster of Paris or the like in a groove $f$ in a ring $f'$. Ring $f'$ is adapted to rest in offset portion $g$ of a bowl-shaped base $g'$ adapted to be secured as by bolts $h$ or the like to any desired kind of bracket or frame work $i$. An annular series of screws $j$ in the offset portion $g$ serves to rigidly hold ring $f'$ therein. In the bottom of the base $g'$ is an aperture $g^2$ for the passage of any desired kind of conductors for the light. This aperture also serves as an entrance for air if desired. Resting within recesses $f^2$ are a plurality of vertical retaining elements $k$ T-shaped in cross section and formed with flanges $k'$ at their lower edges to rest within the recesses and to be secured therein by screws or the like $k^2$. These retaining elements $k$ are disposed between lens portions $b^6$, $b^7$, $b^8$, which are retained in place by flanges $k^3$, $k^3$. On the inner portion of the lens is a retaining strip $k^4$ secured as by screws $k^5$ to the inner side of member $k$ and serving to retain the proximate edges of the lenses between the arms $k^3$ and the strip $k^4$. The adjacent portion of the prisms $B^2$ and the plano-convex lens $B^4$ are cut away as at $b^{10}$ for the reception of the flanges $k^3$. The upper edge of the lens portion $B^4$ is adapted to seat within a groove $l$ in a retaining ring $l'$ having recesses $l^2$ to receive the upper transverse member $k'$ and be secured thereto as by screws $l^3$. Ring $l'$ is formed at its outer edge with an upturned edge $l^4$. Within flange $l^4$ is a ring $m$ formed with a groove $m'$ to receive the lowermost edge of a frustro-conical dome C. Ring $m$ is secured to ring $l'$ by means of bolts $m^2$ passing through appropriate apertures in the rings and through cylindrical spacers $m^3$. By spacing the ring $m$ in this manner from ring $l'$ and flange $l^4$ a passage $n$ is provided for air or products of combustion and expanding gases from the interior of the lens.

It will be observed that the dome portion C is not spherical in outline but for convenience in manufacture is formed in frustro-conical shape and the lenses or flutes are formed as a plurality of concave lenses. Secured to the upper edge of the lens portion $c$ is a ring $o$ having a groove $o'$ to engage the upper edge of lens portion C and a flange $o^2$ to receive the bull's eye lens $d$. The ring $o$ may, if desired, be formed with a plurality of apertures to ventilate the top portion of the interior of the lens. Cement or the like is used in each instance to secure the various rings and lenses together.

While the lens has been shown in Figures 2 and 3 as divided into a plurality of arcuate sections for convenience in manufacture and the frame has been illustrated as adapted to such construction it will be understood that the frame is equally applicable for a unitary cylindrical lens by changes within the ability of an ordinary mechanic. Other similar adaptations will occur to those skilled in the art and are to be deemed within the spirit and scope of the invention.

What I claim is:

1. In combination with a source of light, a sectional lens for emitting a complete hemisphere of light comprising a section formed with a plurality of prisms to diffuse the light outwardly and upwardly, a section plano-convex in cross section to project the light outwardly, a section formed as a truncated cone to diffuse the light upwardly with gradually increased intensity and a plano-convex lens mounted on the truncated section.

2. In combination with a light source, a sectional lens comprising a cylindrical portion formed with a plurality of prisms, a cylindrical portion plano-convex in cross section, a section formed as a truncated cone and formed interiorly with a plurality of concave lenses, and a colored lens mounted on the truncated section.

3. In combination with a light source, a sectional lens for casting a hemispherical beam of light comprising a cylindrical portion subdivided into three arcuate sections of 120° each and each formed with a plurality of prisms and having a plano-convex portion in cross section, a truncated conical section fluted interiorly and a colored plano-convex lens.

4. In combination with a light source, a sectional lens surrounding the light source and comprising a cylindrical portion subdivided into three arcuate sections of 120°, each section formed with a plurality of prisms disposed below the plane of the light source, a cylindrical portion plano-convex in vertical cross section and having its axis disposed in the plane including the horizontal axis of the light source, a dome section of frustro-conical form disposed above said plano-convex section and a colored lens surmounting the frustro-conical lens.

5. In combination, a light source, a sectional lens surrounding the light source and comprising a cylindrical portion subdivided into three arcuate sections of 120°, each section formed with a plurality of prisms disposed below the plane of the light source, a cylindrical portion plano-convex in vertical cross section and having its axis disposed in the plane including the horizontal axis of the light source, a dome section of frustro-conical form disposed above said plano-convex section, a colored lens surmounting the frustro-conical lens, and a frame to secure the various portions together.

6. In combination, a light source, a sectional lens surrounding the light source and comprising a cylindrical portion formed with a plurality of prisms to direct the light rays slightly above the horizontal and said cylindrical portion being disposed below the plane of the light source, a cylindrical portion plano-convex in vertical cross section disposed with its axis in the plane including the horizontal axis of the light source and with its focus at the source of light, a dome of frustro-conical form disposed above said plano-convex portion and being interiorly fluted in horizontal planes to spread the light rays outwardly and upwardly, a bull's eye lens at the top of the frustro-conical dome, and means to secure the various lens portions together.

7. In combination, a light source, a sectional lens surrounding the light source and comprising a cylindrical portion formed with a plurality of prisms to direct the light rays slightly above the horizontal and a cylindrical portion plano-convex in vertical cross section disposed with its axis in the plane including the horizontal axis of the light source and with its focus at the source of light, a dome of frustro-conical form disposed above said plano-convex portion and being interiorly fluted in horizontal planes to spread the light rays outwardly and upwardly, a colored lens at the top of the frustro-conical dome, means to secure the various lenses together and a reflector disposed below the light source.

8. In combination, a light source, a sectional lens surrounding the light source and comprising a cylindrical portion formed with a plurality of prisms to direct the light rays slightly above the horizontal and a cylindrical portion plano-convex in vertical cross section disposed with its axis in the plane including the horizontal axis of the light source and with its focus at the source of light, a dome of frustro-conical form disposed above said plano-convex portion and being interiorly fluted in horizontal planes to spread the light rays outwardly and upwardly in overlapping relation, a colored lens at the top of the frustro-conical dome, means to secure the various lenses together and a deflector whereof the center of curvature lies at the light source.

This specification signed this 5 day of June, A. D. 1924.

ARTHUR V. CONOVER.